United States Patent
Rhoads

(10) Patent No.: US 6,546,112 B1
(45) Date of Patent: *Apr. 8, 2003

(54) SECURITY DOCUMENT WITH STEGANOGRAPHICALLY-ENCODED AUTHENTICATION DATA

(75) Inventor: Geoffrey B. Rhoads, West Linn, OR (US)

(73) Assignee: Digimarc Corporation, Tualatin, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/198,022

(22) Filed: Nov. 23, 1998

Related U.S. Application Data

(63) Continuation of application No. 08/763,847, filed on Dec. 4, 1996, now Pat. No. 5,841,886, which is a continuation of application No. 08/512,993, filed on Aug. 9, 1995, now abandoned, which is a continuation-in-part of application No. 08/436,134, filed on May 8, 1995, now Pat. No. 5,748,763, which is a continuation-in-part of application No. 08/327,426, filed on Oct. 21, 1994, now Pat. No. 5,768,426, which is a continuation-in-part of application No. 08/215,289, filed on Mar. 17, 1994, now abandoned, which is a continuation-in-part of application No. 08/154,866, filed on Nov. 18, 1993, now abandoned.

(51) Int. Cl.$^7$ .................................................. H04K 1/00
(52) U.S. Cl. ........................................ 382/100; 283/77
(58) Field of Search ................................ 382/181, 232, 382/239, 190, 195, 209, 100; 380/54, 210, 252, 287, 51; 283/72, 74, 77, 85, 113, 901; 713/176

(56) References Cited

U.S. PATENT DOCUMENTS

| | | | | |
|---|---|---|---|---|
| 4,689,477 A | * | 8/1987 | Goldman | 235/380 |
| 4,972,476 A | * | 11/1990 | Nathans | 380/23 |
| 5,237,164 A | | 8/1993 | Takada | 235/487 |
| 5,284,364 A | | 2/1994 | Jain | 283/87 |
| 5,319,453 A | | 6/1994 | Copriviza et al. | 348/6 |
| 5,337,361 A | | 8/1994 | Wang et al. | 380/51 |
| 5,379,345 A | | 1/1995 | Greenberg | 380/23 |
| 5,384,846 A | | 1/1995 | Berson et al. | 380/23 |
| 5,471,533 A | * | 11/1995 | Wang et al. | 380/51 |
| 5,646,997 A | | 7/1997 | Barton | 380/23 |
| 5,652,626 A | | 7/1997 | Kawakami et al. | 348/463 |
| 5,659,726 A | * | 8/1997 | Sandford, II et al. | 395/612 |
| 5,694,471 A | | 12/1997 | Chen et al. | 380/25 |
| 5,721,788 A | * | 2/1998 | Powell et al. | 382/100 |
| 5,768,426 A | | 6/1998 | Rhoads | 382/232 |
| 5,864,622 A | | 1/1999 | Marcus | 380/23 |
| 6,024,287 A | | 2/2000 | Takai et al. | 235/493 |
| 6,289,108 B1 | | 9/2001 | Rhoads | 382/100 |
| 6,292,092 B1 | | 9/2001 | Chow et al. | 340/5.6 |
| 6,343,138 B1 | * | 1/2002 | Rhoads | 382/100 |

FOREIGN PATENT DOCUMENTS

| | | | | |
|---|---|---|---|---|
| DE | 29 43 436 A1 | * | 5/1981 | G06K/19/06 |
| EP | 0629972 A2 | | 12/1994 | G06K/15/02 |
| EP | 0 642 060 A2 | * | 3/1995 | G03G/15/01 |
| EP | 0 642 060 B1 | | 4/1999 | G03G/15/01 |
| JP | 3-185585 A | | 8/1991 | G06K/17/00 |

OTHER PUBLICATIONS

Kawaguchi et al., "Principle and Applications of BPCS–Steganography," *Proc. SPIE vol. 3528: Multimedia Systems and Applications*, Nov. 2–4, 1998, pp. 464–473.*

Komatsu et al., "A Proposal on Digital Watermarking in Document Image Communication and Its Application to Realizing a Signature," *Electronics and Communications in Japan*, Part I, vol. 73, No. 5, 1990, pp. 22–33.*

(List continued on next page.)

*Primary Examiner*—Andrew W. Johns
(74) *Attorney, Agent, or Firm*—William Y. Conwell; Digimarc Corporation

(57) ABSTRACT

Security of a document is enhanced by steganographically embedding, within a graphic on the document, data that can be used in conjunction with text on the document to authenticate the document.

31 Claims, 5 Drawing Sheets

OTHER PUBLICATIONS

Komatsu et al., "Authentication System Using Concealed Image in Telematics," *Memoirs of the School of Science & Engineering, Waseda Univ.*, No. 52, 1988, pp. 45–60.*

Szepanski, "A Signal Theoretic Method for Creating Forgery–Proof Documents for Automatic Verification," *Proc. 1979 Carnahan Conf. on Crime Countermeasures*, May 16–18, 1979, pp. 101–109.*

Chow et al., "Forgery and Tamper–Proof Identification Document," *IEEE Proc. 1993 Int. Carnahan Conf. on Security Technology*, Oct. 13–15, 1993, pp. 11–14.*

Szepanski, "A Signal Theoretic Method For Creating Forgery–Proof Documents For Automatic Verification", *1979 Carnahan Conference on Crime Countermeasures*, University of Kentucky, Lexington, Kentucky, May 16–18, 1979.

* cited by examiner

CABLE, 964, TO DATA LINE, 966

960

962

958

CONTAINS RUDIMENTARY OPTICAL SCANNER, MEMORY BUFFERS, COMMUNICATIONS DEVICES, AND MICROPROCESSOR

CONSUMER MERELY PLACES CARD INTO WINDOW AND CAN, AT THEIR PREARRANGED OPTION, EITHER TYPE IN A PERSONAL IDENTIFICATION NUMBER (PIN, FOR ADDED SECURITY) OR NOT. THE TRANSACTION IS APPROVED OR DISAPPROVED WITHIN SECONDS.

THE NEGLIGIBLE-FRAUD CASH CARD SYSTEM

A BASIC FOUNDATION OF THE CASH CARD SYSTEM IS A 24-HOUR INFORMATION NETWORK, WHERE BOTH THE STATIONS WHICH CREATE THE PHYSICAL CASH CARDS, 950, AND THE POINT-OF-SALES, 984, ARE ALL HOOKED UP TO THE SAME NETWORK CONTINUOUSLY

SECURITY DOCUMENT WITH STEGANOGRAPHICALLY-ENCODED AUTHENTICATION DATA

RELATED APPLICATION DATA

This application is a continuation of application Ser. No. 08/763,847, filed Dec. 4, 1996, now U.S. Pat. No. 5,841,886, which is a continuation of application Ser. No. 08/512,993, filed Aug. 9, 1995, now abandoned, which is a continuation-in-part of application Ser. No. 08/436,134, filed May 8, 1995, now U.S. Pat. No. 5,748,763, which is a continuation-in-part of application Ser. No. 08/327,426, filed Oct. 21, 1994, now U.S. Pat. No. 5,768,426, which is a continuation-in-part of application Ser. No. 08/215,289, filed Mar. 17, 1994, now abandoned, which is a continuation-in-part of application Ser. No. 08/154,866, filed Nov. 18, 1993, now abandoned.

TECHNICAL FIELD

The present invention relates to the field of photograph-based identification systems.

BACKGROUND AND SUMMARY OF THE INVENTION

The use of photograph-based identification ("photo ID") systems is pervasive. Drivers' licenses, passports, visas, government employee cards, immigration documents, and now, more frequently, credit cards and cash transaction cards carry a photograph of the card bearer for identification purposes. Many industries require that their employees carry photo ID on the job.

Fraudulent use of photo ID systems may occur where, for example, an otherwise legitimate passport is modified such that the original photograph is swapped with that of another person, thereby enabling the other person to travel, at least temporarily, under the guise of the original passport holder.

Even in the absence of photograph swapping or alteration, it is oftentimes difficult to confirm by inspection that the individual depicted in the photograph of the identification card is indeed the bearer of the card.

One aspect of this invention provides for enhanced security and certainty in the use of photo ID documents.

An illustrative embodiment of the present invention is a method of correlating, with a photograph, information about an individual whose image appears in the photograph. The method includes steganographically encoding multi-bit information into the photograph. This encoding serves to add noise to the photograph—noise that is not generally perceptible as a representation of the multi-bit information except by computer analysis. (The encoded photograph appears to convey only an image of the individual to viewers of the photograph.) Sometime after encoding, the multi-bit information is decoded. Finally, some sort of authentication decision about the individual is made, based at least in part on the multi-bit information decoded from the photograph.

Another illustrative embodiment of the present invention is a substrate (e.g. a card, or a page from a magazine) with a photograph. The photograph is steganographically encoded with multi-bit data related to the photograph. This data is manifested as a slight snow effect that is not generally perceptible as a representation of the multi-bit data except by computer analysis. The multi-bit data can serve various purposes (e.g. identify an owner of the photograph; serve as a serial number index into a database, etc.).

The foregoing and other aspects of the invention will be more readily apparent from the following detailed description, which proceeds with reference to the accompanying drawings.

DETAILED DESCRIPTION OF PREFERRED EMBODIMENTS

To provide a comprehensive disclosure without unduly lengthening the present specification, applicant incorporates by reference the Drawings and Detailed Description (only) from applicant's U.S. Pat. No. 5,710,834.
Plastic Credit and Debit Card Systems Based on the Principles of the Invention Growth in the use of plastic credit cards, and more recently debit cards and ATM cash cards, needs little introduction. Nor does there need to be much discussion here about the long history of fraud and illicit uses of these financial instruments. The development of the credit card hologram, and its subsequent forgery development, nicely serves as a historic example of the give and take of plastic card security measures and fraudulent countermeasures. This section will concern itself with how the principles of this invention can be realized in an alternative, highly fraud-proof yet cost effective plastic card-based financial network.

A basic list of desired features for an ubiquitous plastic economy might be as follows: 1) A given plastic financial card is completely impossible to forge; 2) An attempted forged card (a "look-alike") cannot even function within a transaction setting; 3) Intercepted electronic transactions by a would-be thief would not in any way be useful or re-useable; 4) In the event of physical theft of an actual valid card, there are still formidable obstacles to a thief using that card; and 5) The overall economic cost of implementation of the financial card network is equal to or less than that of the current international credit card networks, i.e., the fully loaded cost per transaction is equal to or less than the current norm, allowing for higher profit margins to the implementors of the networks. Apart from item 5, which would require a detailed analysis of the engineering and social issues involved with an all out implementation strategy, the following use of the principles of this invention may well achieve the above list, even item 5.

Figure 3:
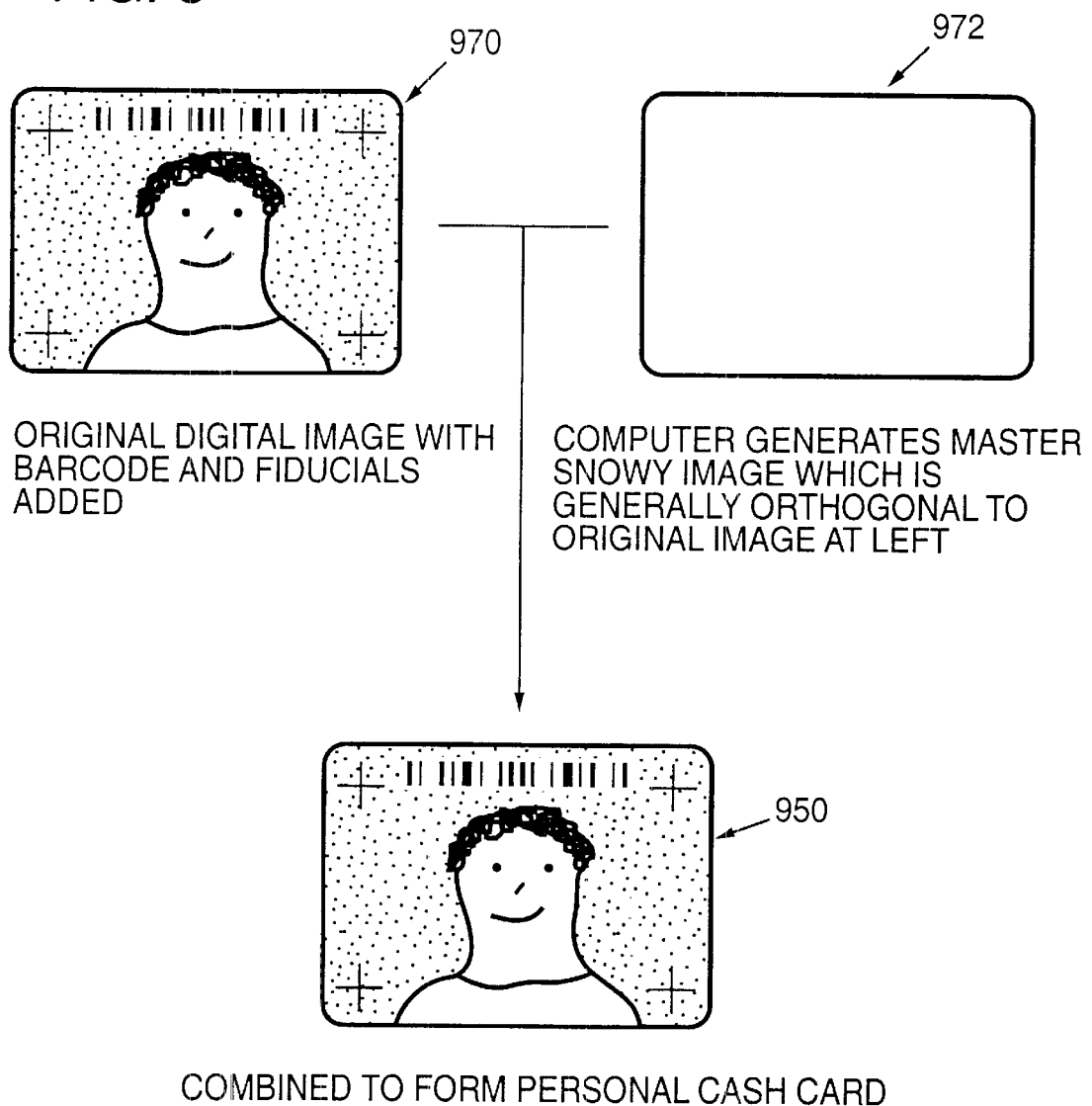
Figure 4:
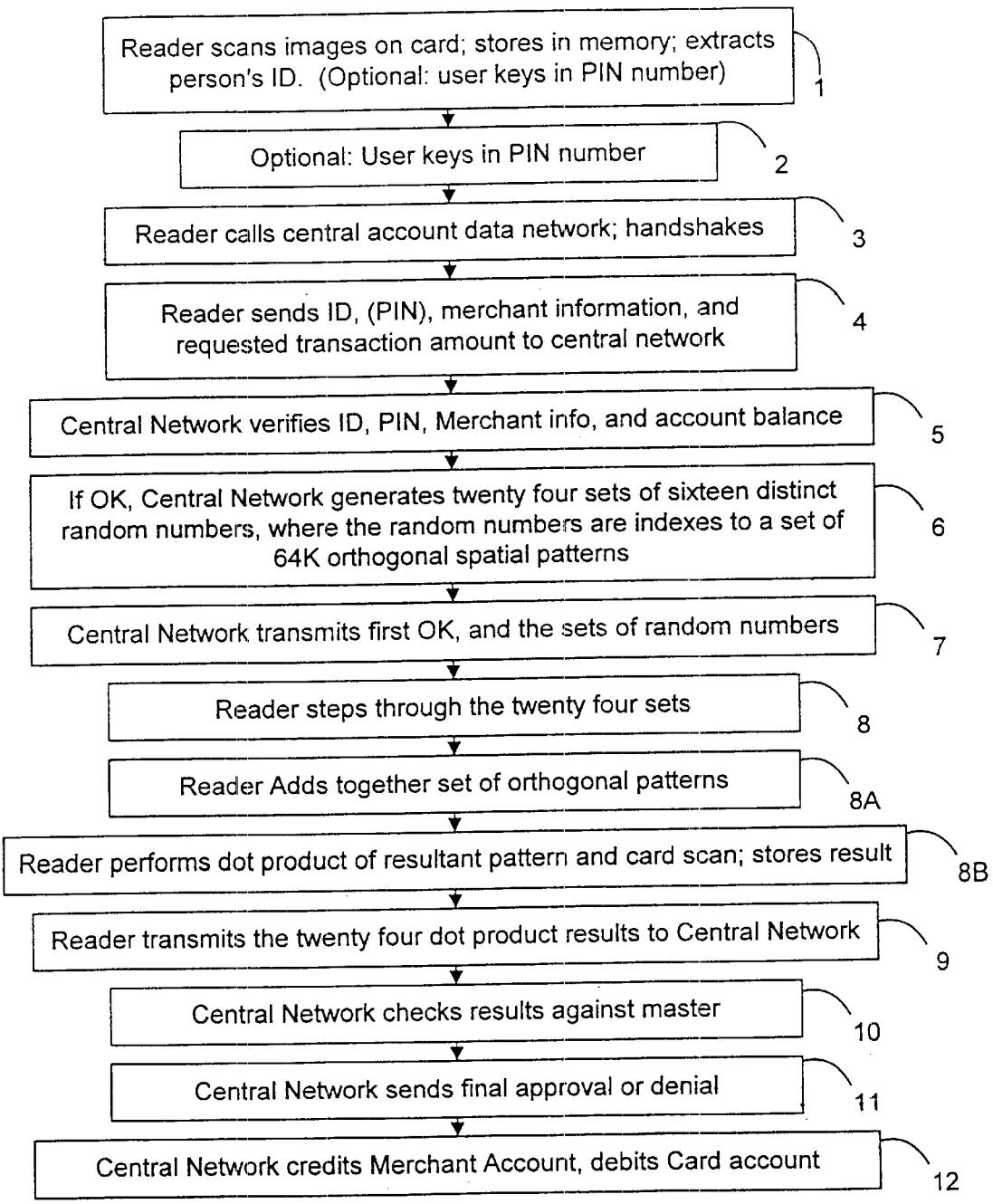
Figure 5:
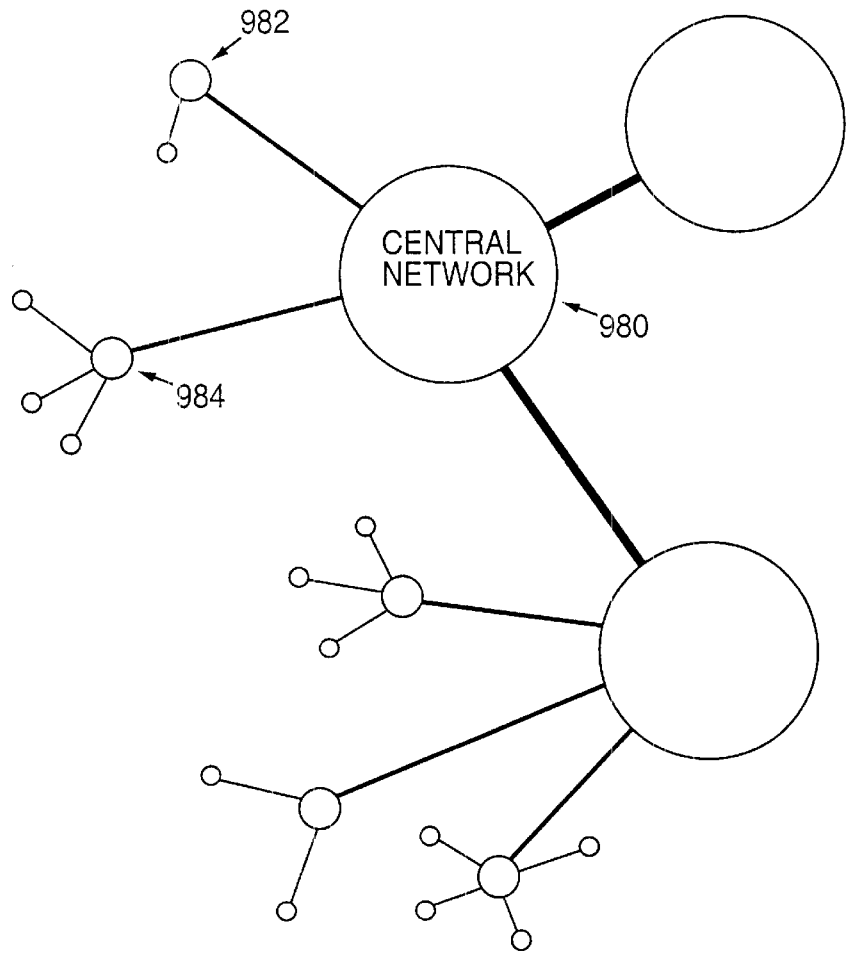

FIGS. 1 through 5, along with the ensuing written material, collectively outline what is referred to in FIG. 5 as "The Negligible-Fraud Cash Card System." The reason that the fraud-prevention aspects of the system are highlighted in the title is that fraud, and the concomitant lost revenue therefrom, is apparently a central problem in today's plastic card based economies. The differential advantages and disadvantages of this system relative to current systems will be discussed after a preferred embodiment is presented.

Figure 1:
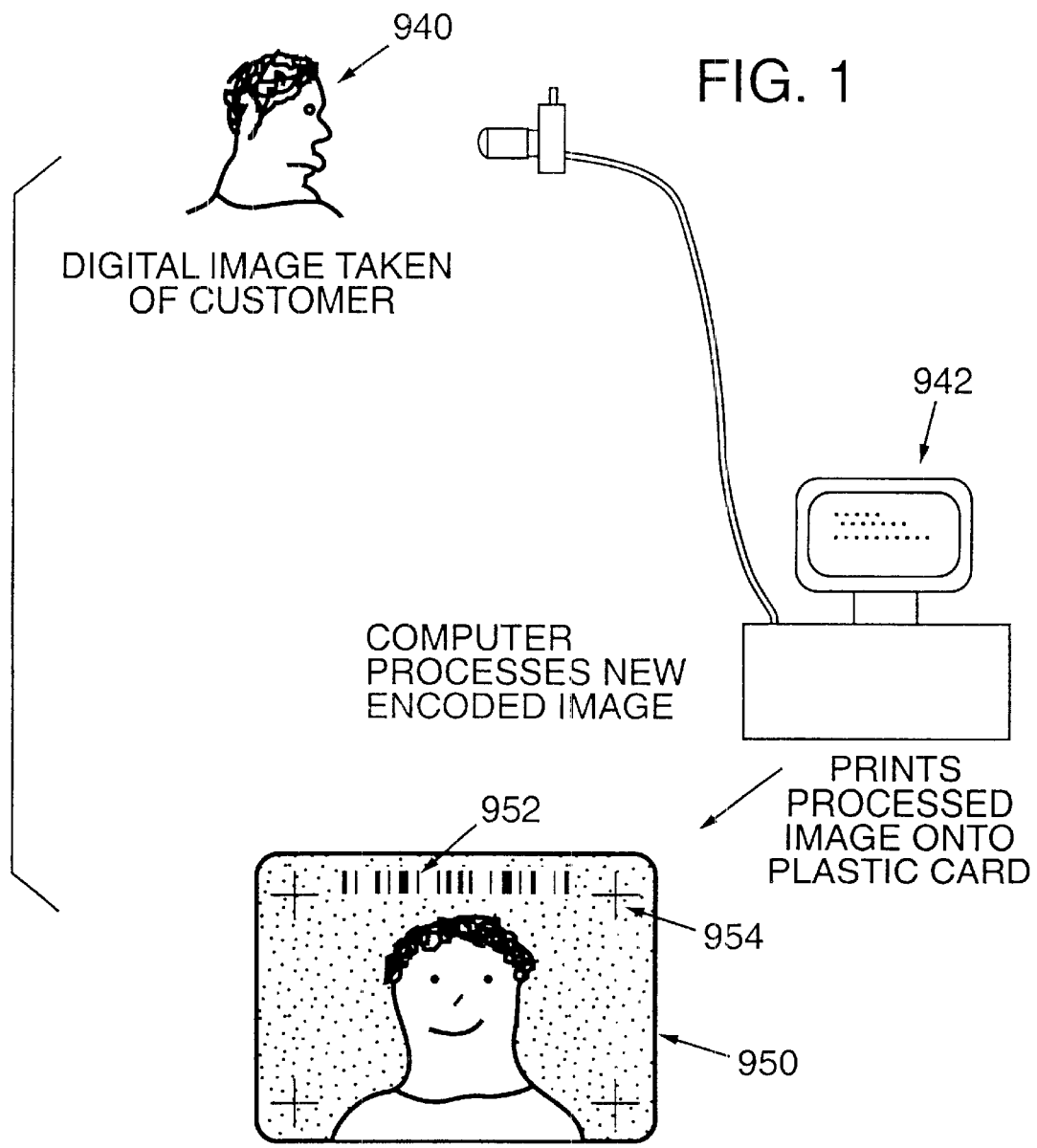
FIGS. 1–5 detail aspects of a security card according to one embodiment of the present invention.

FIG. 1 illustrates the basic unforgeable plastic card which is quite unique to each and every user. A digital image 940 is taken of the user of the card. A computer, which is hooked into the central accounting network, 980, depicted in FIG. 5, receives the digital image 940, and after processing it (as will be described surrounding FIG. 3) produces a final rendered image which is then printed out onto the personal cash card 950. Also depicted in FIG. 1 is a straightforward identification marking, in this case a bar code 952, and optional position fiducials which may assist in simplifying the scanning tolerances on the Reader 958 depicted in FIG. 2.

The short story is that the personal cash card 950 actually contains a very large amount of information unique to that particular card. There are no magnetic strips involved, though the same principles can certainly be applied to magnetic strips, such as an implanted magnetic noise signal (see the Feb. 8, 1994, Wall Street Journal, page B1, which discusses the use of very fine magnetic fluxuations on the magnetic strips of credit cards (fluxuations that tend to be unique from one card to the next) as a means of credit card authentication; here, the fingerprinting would be prominent and proactive as opposed to passive). In any event, the unique information within the image on the personal cash card 950 is stored along with the basic account information in a central accounting network, 980, FIG. 5. The basis for unbreakable security is that during transactions, the central network need only query a small fraction of the total information contained on the card, and never needs to query the same precise information on any two transactions. Hundreds if not thousands or even tens of thousands of unique and secure "transaction tokens" are contained within a single personal cash card. Would-be pirates who went so far as to pick off transmissions of either encrypted or even unencrypted transactions would find the information useless thereafter. This is in marked distinction to systems which have a single complex and complete "key" (generally encrypted) which needs to be accessed, in its entirety, over and over again. The personal cash card on the other hand contains thousands of separate and secure keys which can be used once, within milliseconds of time, then forever thrown away (as it were). The central network 980 keeps track of the keys and knows which have been used and which haven't.

Figure 2:
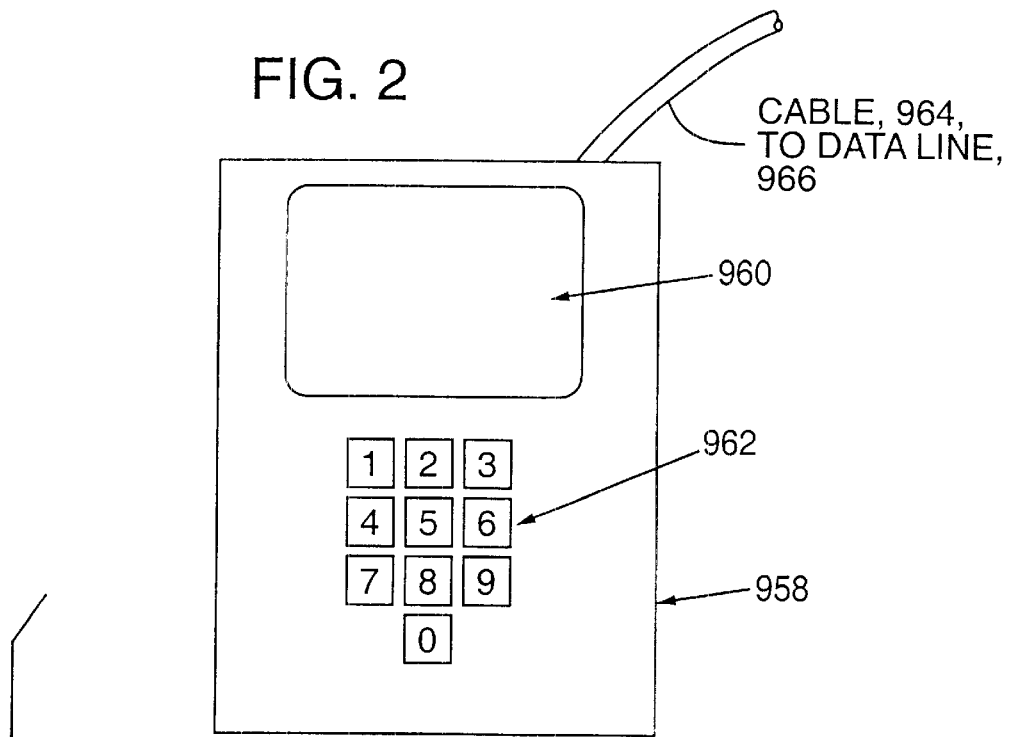

FIG. 2 depicts what a typical point-of-sale reading device, 958, might look like. Clearly, such a device would need to be manufacturable at costs well in line with, or cheaper than, current cash register systems, ATM systems, and credit card swipers. Not depicted in FIG. 2 are the innards of the optical scanning, image processing, and data communications components, which would simply follow normal engineering design methods carrying out the functions that are to be described henceforth and are well within the capability of artisans in these fields. The reader 958 has a numeric punch pad 962 on it, showing that a normal personal identification number system can be combined with the overall design of this system adding one more conventional layer of security (generally after a theft of the physical card has occurred). It should also be pointed out that the use of the picture of the user is another strong (and increasingly common) security feature intended to thwart after-theft and illicit use. Functional elements such as the optical window, 960, are shown, mimicking the shape of the card, doubling as a centering mechanism for the scanning. Also shown is the data line cable 966 presumably connected either to a proprietor's central merchant computer system or possibly directly to the central network 980. Such a reader may also be attached directly to a cash register which performs the usual tallying of purchased items. Perhaps overkill on security would be the construction of the reader, 958, as a type of Faraday cage such that no electronic signals, such as the raw scan of the card, can emanate from the unit. The reader 958 does need to contain, preferably, digital signal processing units which will assist in swiftly calculating the dot product operations described henceforth. It also should contain local read-only memory which stores a multitude of spatial patterns (the orthogonal patterns) which will be utilized in the "recognition" steps outlined in FIG. 4 and its discussion. As related in FIG. 2, a consumer using the plastic card merely places their card on the window to pay for a transaction. A user could choose for themselves if they want to use a PIN number or not. Approval of the purchase would presumably happen within seconds, provided that the signal processing steps of FIG. 4 are properly implemented with effectively parallel digital processing hardware.

FIG. 3 takes a brief look at one way to process the raw digital image, 940, of a user into an image with more useful information content and uniqueness. It should be clearly pointed out that the raw digital image itself could in fact be used in the following methods, but that placing in additional orthogonal patterns into the image can significantly increase the overall system. (Orthogonal means that, if a given pattern is multiplied by another orthogonal pattern, the resulting number is zero, where "multiplication of patterns" is meant in the sense of vector dot products; these are all familiar terms and concepts in the art of digital image processing). FIG. 3 shows that the computer 942 can, after interrogating the raw image 970, generate a master snowy image 972 which can be added to the raw image 970 to produce a yet-more unique image which is the image that is printed onto the actual personal cash card, 950. The overall effect on the image is to "texturize" the image. In the case of a cash card, invisibility of the master snowy pattern is not as much of a requirement as with commercial imagery, and one of the only criteria for keeping the master snowy image somewhat lighter is to not obscure the image of the user. The central network, 980, stores the final processed image in the record of the account of the user, and it is this unique and securely kept image which is the carrier of the highly secure "throw-away transaction keys." This image will therefore be "made available" to all duly connected point-of-sale locations in the overall network. As will be seen, none of the point-of-sale locations ever has knowledge of this image, they merely answer queries from the central network.

FIG. 4 steps through a typical transaction sequence. The figure is laid out via indentations, where the first column are steps performed by the point-of-sale reading device 958, the second column has information transmission steps communicated over the data line 966, and the third column has steps taken by the central network 980 which has the secured information about the user's account and the user's unique personal cash card 950. Though there is some parallelism possible in the implementation of the steps, as is normally practiced in the engineering implementation of such systems, the steps are nevertheless laid out according to a general linear sequence of events.

Step one of FIG. 4 is the standard "scanning" of a personal cash card 950 within the optical window 960. This can be performed using linear optical sensors which scan the window, or via a two dimensional optical detector array such as a CCD. The resulting scan is digitized into a grey scale image and stored in an image frame memory buffer such as a "framegrabber," as is now common in the designs of optical imaging systems. Once the card is scanned, a first image processing step would probably be locating the four fiducial center points, 954, and using these four points to guide all further image processing operations (i.e. the four fiducials "register" the corresponding patterns and barcodes on the personal cash card). Next, the barcode ID number would be extracted using common barcode reading image processing methods. Generally, the user's account number would be determined in this step.

Step two of FIG. 4 is the optional typing in of the PIN number. Presumably most users would opt to have this feature, except those users who have a hard time remembering such things and who are convinced that no one will ever steal their cash card.

Step three of FIG. 4 entails connecting through a data line to the central accounting network and doing the usual communications handshaking as is common in modem-based communications systems. The preferred embodiment of this system would obviate the need for standard phone lines, such as the use of optical fiber data links, but for now we can assume it is a garden variety belltone phone line and that the reader 958 hasn't forgotten the phone number of the central network.

After basic communications are established, step four shows that the point-of-sale location transmits the ID number found in step 1, along with probably an encrypted version of the PIN number (for added security, such as using the ever more ubiquitous RSA encryption methods), and appends the basic information on the merchant who operates the point-of-sale reader 958, and the amount of the requested transaction in monetary units.

Step five has the central network reading the ID number, routing the information accordingly to the actual memory location of that user's account, thereafter verifying the PIN number and checking that the account balance is sufficient to cover the transaction. Along the way, the central network also accesses the merchant's account, checks that it is valid, and readies it for an anticipated credit.

Step six begins with the assumption that step five passed all counts. If step five didn't, the exit step of sending a NOT OK back to the merchant is not depicted. So, if everything checks out, the central network generates twenty four sets of sixteen numbers, where all numbers are mutually exclusive, and in general, there will be a large but quite definitely finite range of numbers to choose from. FIG. 4 posits the range being 64K or 65536 numbers. It can be any practical number, actually. Thus, set one of the twenty four sets might have the numbers 23199, 54142, 11007, 2854, 61932, 32879, 38128, 48107, 65192, 522, 55723, 27833, 19284, 39970, 19307, and 41090, for example. The next set would be similarly random, but the numbers of set one would be off limits now, and so on through the twenty four sets. Thus, the central network would send (16×24×2 bytes) of numbers or 768 bytes. The actual amount of numbers can be determined by engineering optimization of security versus transmission speed issues. These random numbers are actually indexes to a set of 64K universally a priori defined orthogonal patterns which are well known to both the central network and are permanently stored in memory in all of the point-of-sale readers. As will be seen, a would-be thief's knowledge of these patterns is of no use.

Step seven then transmits the basic "OK to proceed" message to the reader, 958, and also sends the 24 sets of 16 random index numbers.

Step eight has the reader receiving and storing all these numbers. Then the reader, using its local microprocessor and custom designed high speed digital signal processing circuitry, steps through all twenty four sets of numbers with the intention of deriving 24 distinct floating point numbers which it will send back to the central network as a "one time key" against which the central network will check the veracity of the card's image. The reader does this by first adding together the sixteen patterns indexed by the sixteen random numbers of a given set, and then performing a common dot product operation between the resulting composite pattern and the scanned image of the card. The dot product generates a single number (which for simplicity we can call a floating point number). The reader steps through all twenty four sets in like fashion, generating a unique string of twenty four floating point numbers.

Step nine then has the reader transmitting these results back to the central network.

Step ten then has the central network performing a check on these returned twenty four numbers, presumably doing its own exact same calculations on the stored image of the card that the central network has in its own memory. The numbers sent by the reader can be "normalized," meaning that the highest absolute value of the collective twenty four dot products can divided by itself (its unsigned value), so that brightness scale issues are removed. The resulting match between the returned values and the central network's calculated values will either be well within given tolerances if the card is valid, and way off if the card is a phony or if the card is a crude reproduction.

Step eleven then has the central network sending word whether or not the transaction was OK, and letting the customer know that they can go home with their purchased goods.

Step twelve then explicitly shows how the merchant's account is credited with the transaction amount.

As already stated, the primary advantage of this plastic card invention is to significantly reduce fraud, which apparently is a large cost to current systems. This system reduces the possibility of fraud only to those cases where the physical card is either stolen or very carefully copied. In both of these cases, there still remains the PIN security and the user picture security (a known higher security than low wage clerks analyzing signatures). Attempts to copy the card must be performed through "temporary theft" of the card, and require photo-quality copying devices, not simple magnetic card swipers. The system is founded upon a modern 24 hour highly linked data network. Illicit monitoring of transactions does the monitoring party no use whether the transmissions are encrypted or not.

Figure 6:
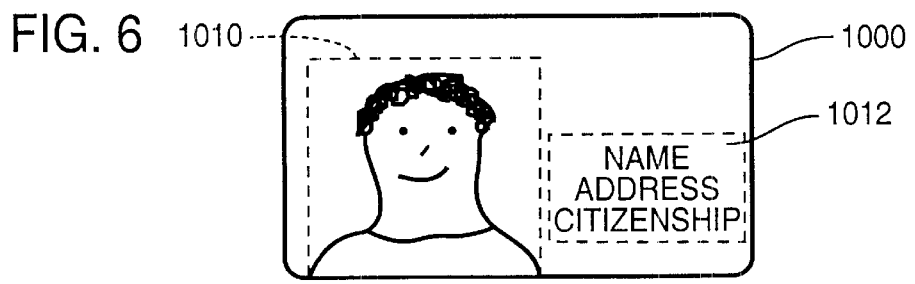
FIG. 6 is a diagram of a photographic identification document or security card with which the security system aspect of the present invention may be applied.

It will be appreciated that the foregoing approach to increasing the security of transactions involving credit and debit card systems is readily extended to any photograph-based identification system. Moreover, the principles of the present invention may be applied to detect alteration of photo ID documents, and to generally enhance the confidence and security of such systems. In this regard, reference is made to FIG. 6, which depicts a photo-ID card or document 1000 which may be, for example, a passport or visa, driver's license, credit card, government employee identification, or a private industry identification badge. For convenience, such photograph-based identification documents will be collectively referred to as photo ID documents.

The photo ID document includes a photograph 1010 that is attached to the document 1000. Printed, human-readable information 1012 is incorporated in the document 1000, adjacent to the photograph 1010. Machine readable information, such as that known as "bar code" may also be included adjacent to the photograph.

Generally, the photo ID document is constructed so that tampering with the document (for example, swapping the original photograph with another) should cause noticeable damage to the card. Nevertheless, skilled forgerers are able to either alter existing documents or manufacture fraudulent photo ID documents in a manner that is extremely difficult to detect.

As noted above, the present invention enhances the security associated with the use of photo ID documents by supplementing the photographic image with encoded information (which information may or may not be visually perceptible), thereby facilitating the correlation of the photographic image with other information concerning the person, such as the printed information 1012 appearing on the document 1000.

In one embodiment of this aspect of the invention, the photograph 1010 may be produced from a raw digital image to which is added a master snowy image as described above in connection with FIGS. 1–3. The above-described central network and point-of-sale reading device (which device, in the present embodiment, may be considered as a point-of-entry or point-of-security photo ID reading device), would essentially carry out the same processing as described with that embodiment, including the central network generation of unique numbers to serve as indices to a set of defined orthogonal patterns, the associated dot product operation carried out by the reader, and the comparison with a similar operation carried out by the central network. If the numbers generated from the dot product operation carried out by the reader and the central network match, in this embodiment, the network sends the OK to the reader, indicating a legitimate or unaltered photo ID document.

In another embodiment of this aspect of the invention, the photograph component 1010 of the identification document 1000 may be digitized and processed so that the photographic image that is incorporated into the photo ID document 1000 corresponds to the "distributable signal" as defined above. In this instance, therefore, the photograph includes a composite, embedded code signal, imperceptible to a viewer, but carrying an N-bit identification code. It will be appreciated that the identification code can be extracted from the photo using any of the decoding techniques described above, and employing either universal or custom codes, depending upon the level of security sought.

It will be appreciated that the information encoded into the photograph may correlate to, or be redundant with, the readable information 1012 appearing on the document. Accordingly, such a document could be authenticated by placing the photo ID document on a scanning system, such as would be available at a passport or visa control point. The local computer, which may be provided with the universal code for extracting the identification information, displays the extracted information on the local computer screen so that the operator is able to confirm the correlation between the encoded information and the readable information 1012 carried on the document.

It will be appreciated that the information encoded with the photograph need not necessarily correlate with other information on an identification document. For example, the scanning system may need only to confirm the existence of the identification code so that the user may be provided with a "go" or "no go" indication of whether the photograph has been tampered with. It will also be appreciated that the local computer, using an encrypted digital communications line, could send a packet of information to a central verification facility, which thereafter returns an encrypted "go" or "no go" indication.

In another embodiment of the present invention, it is contemplated that the identification code embedded in the photograph may be a robust digital image of biometric data, such as a fingerprint of the card bearer, which image, after scanning and display, may be employed for comparison with the actual fingerprint of the bearer in very high security access points where on-the-spot fingerprint recognition systems (or retinal scans, etc.) are employed.

It will be appreciated that the information embedded in the photograph need not be visually hidden or steganographically embedded. For example, the photograph incorporated into the identification card may be a composite of an image of the individual and one-, or two-dimensional bar codes. The bar code information would be subject to conventional optical scanning techniques (including internal cross checks) so that the information derived from the code may be compared, for example, to the information printed on the identification document.

It is also contemplated that the photographs of ID documents currently in use may be processed so that information correlated to the individual whose image appears in the photograph may be embedded. In this regard, the reader's attention is directed to the foregoing portion of this description entitled "Use in Printing, Paper, Documents, Plastic-Coated Identification Cards, and Other Material Where Global Embedded Codes Can Be Imprinted," wherein there is described numerous approaches to modulation of physical media that may be treated as "signals" amenable to application of the present invention principles.

I claim:

1. A photo identification document, characterized by steganographic encoding representing multi-bit data, said multi-bit data being computer-discernable from analysis of visible light scan data, but the existence of said encoded data not being evident to human observers of the document.

2. A plastic document according to claim 1.

3. A driver's license according to claim 1.

4. A plastic-encased driver's license according to claim 1.

5. The photo identification document of claim 1 in which the encoding is locally scaled in amplitude in accordance with visible features on the document.

6. The photo identification document of claim 1 in which the steganographic encoding spans some, but not all, of the document.

7. The photo identification document of claim 1 in which the steganographic encoding encompasses regions of the document distinct from any text or image thereon.

8. The photo identification document of claim 1 in which the encoding comprises slight changes to a visible image, the changes being tailored in accordance with local characteristics of the image so as to minimize impairing the aesthetics thereof.

9. The photo identification document of claim 1 in which each bit of the multi-bit data is encoded in plural locations across the document, but the encoding thereof is different at different locations.

10. The photo identification document of claim 1 in which the encoding comprises a texture imparted to a surface of said document.

11. The photo identification document of claim 1 in which the encoding comprises a calibration signal, said signal aiding the later decoding of said multi-bit data.

12. The photo identification document of claim 11 wherein the calibration signal is not apparent to human observers of the document.

13. The photo identification document of claim 1 having human-readable information formed thereon, and wherein the steganographic encoding represents data that is redundant with at least some of said human-readable information.

14. The photo identification document of claim 1 having human-readable information formed thereon, and wherein the steganographic encoding represents data that is correlated with, but not redundant of, the human-readable information.

15. The photo identification document of claim 1 having both human-readable information and a barcode formed thereon.

16. The method of claim 13 wherein the multi-bit data comprises an index into a registry containing additional information.

17. The method of claim 16 in which the encoding is locally scaled in amplitude in accordance with visible features on the document.

18. The method of claim 13 wherein the photo identification document comprises a plastic document.

19. The method of claim 13 wherein the photo identification document comprises a driver's license.

20. The method of claim 13 wherein some regions of the document are not steganographically encoded.

21. The method of claim 13 wherein the encoding slightly changes a visible image on the document to encode the multi-bit data therein, the changes being adjusted in accordance with local characteristics of the visible image so as to avoid impairing the aesthetics thereof.

22. The method of claim 13 in which each bit of the multi-bit data is encoded at plural locations across the document, but the encoding of each said bit takes different forms at different locations.

23. The method of claim 13 in which the encoding includes texturing a surface micro-topology of the document to encode the plural binary bits therein.

24. The method of claim 13, further characterized by encoding a calibration signal in the photo, said calibration signal aiding the later decoding of the multi-bit data.

25. The method of claim 24 in which the calibration signal is not apparent to human observers of the document.

26. The method of claim 13 in which said encoding encompasses regions of the document distinct from any text or photo thereon.

27. The method of claim 16, further characterized by encoding a calibration signal in the photo, said calibration signal aiding the later decoding of the multi-bit data.

28. The method of claim 27 in which the calibration signal is not apparent to human observers of the document.

29. The method of claim 16 in which said encoding encompasses regions of the document distinct from any text or photo thereon.

30. A method of processing a photo identification document comprising:

using an inspection device, scanning the photo identification document using visible light to produce scan data;

decoding steganographically-encoded information from the scan data; and presenting data related to said decoded information to an operator of the inspection device.

31. The method of claim 30 that includes:

encrypting information from the inspection device;

transmitting the encrypted information to a remote processor; and wherein said presenting comprises presenting information returned from said remote processor to the operator.

* * * * *

UNITED STATES PATENT AND TRADEMARK OFFICE
CERTIFICATE OF CORRECTION

PATENT NO. : 6,546,112 B1
DATED : April 8, 2003
INVENTOR(S) : Geoffrey B. Rhoads It is certified that error appears in the above-identified patent and that said Letters Patent is hereby corrected as shown below:

<u>Column 8,</u>
Lines 53-56, change "13. The photo identification document of claim 1 having human-readable information formed thereon, and wherein the steganographic encoding represents data that is redundant with at least some of said human-readable information." to
-- 13. A method of producing a photo identification document, the document being characterized by steganographic encoding representing multi-bit data, said multi-bit data being computer-discernable from analysis of visible light scan data, but the existence of said encoded data not being evident to human observers of the document, the steganographic encoding including:
providing the multi-bit data and at least one noise signal to computing device;
receiving from said computing device a noise-like output signal; and
additively applying the noise-like output signal to the document. --

Lines 57-61, change claim "14. The photo identification document of claim 1 having human-readable information formed thereon, and wherein the steganographic encoding represents data that is correlated with, but not redundant of, the human-readable information." to
-- 14. The method of claim 13 in which the encoding is locally scaled in amplitude in accordance with visible features on the document. --

Lines 62-64, change claim "15. The photo identification document of claim 1 having both human-readable information and a barcode formed thereon." to
-- 15. The method of claim 13 in which the photo identification document includes printed text, and the multi-bit data corresponds to at least a part of said printed text. --.

<u>Column 9,</u>
Lines 1-3, change claim "17. The method of claim 16 in which the encoding is locally scaled in amplitude in accordance with visible features on the document." to
-- 17. The method of claim 13 in which the photo identification document includes printed text, and the multi-bit data is useful in cooperation with at least part of said printed text to verify authenticity of the document. --

UNITED STATES PATENT AND TRADEMARK OFFICE
CERTIFICATE OF CORRECTION

PATENT NO.    : 6,546,112 B1
DATED         : April 8, 2003
INVENTOR(S)   : Geoffrey B. Rhoads It is certified that error appears in the above-identified patent and that said Letters Patent is hereby corrected as shown below:

Column 10,
Lines 1-3, change claim "27. The method of claim 16, further characterized by encoding a calibration signal in the photo, said calibration signal aiding the later decoding of the multi-bit data." to
-- 27. The photo identification document of claim 1 having human-readable information formed thereon, and wherein the steganographic encoding represents data that is redundant with at least some of said human-readable information. --

Lines 4-5, change claim "28. The method of claim 27 in which the calibration signal is not apparent to human observers of the document." to
-- 28. The photo identification document of claim 1 having human-readable information formed thereon, and wherein the steganographic encoding represents data that is correlated with, but not redundant of, the human-readable information. --

Lines 6-8, change claim "29. The method of claim 16 in which said encoding encompasses regions of the document distinct from any text or photo thereon." to
-- 29. The photo identification document of claim 1 having both human-readable information and a barcode formed thereon. --

Signed and Sealed this

Twenty-sixth Day of August, 2003

JAMES E. ROGAN
*Director of the United States Patent and Trademark Office*